(12) United States Patent
Kubota

(10) Patent No.: US 6,295,358 B1
(45) Date of Patent: Sep. 25, 2001

(54) HINGE DEVICE

(75) Inventor: Naoki Kubota, Nagaoka (JP)

(73) Assignee: Straberry Corporation, Saitama-ken (JP)

( * ) Notice: Subject to any disclaimer, the term of this patent is extended or adjusted under 35 U.S.C. 154(b) by 0 days.

(21) Appl. No.: 09/357,274

(22) Filed: Jul. 20, 1999

(30) Foreign Application Priority Data

Dec. 3, 1998 (JP) .................................................. 10-344694
May 12, 1999 (JP) .................................................. 11-132005

(51) Int. Cl.[7] .................................................. H04M 1/00
(52) U.S. Cl. .................................................. 379/433.13
(58) Field of Search .................................... 379/433, 428; 455/575, 90; 16/342, 325

(56) References Cited

U.S. PATENT DOCUMENTS 5,636,275 * 6/1997 Takagi et al. ..................... 379/433

FOREIGN PATENT DOCUMENTS

| | | |
|---|---|---|
| 07133686 | 5/1995 | (JP) . |
| 08121462 | 5/1996 | (JP) . |
| 08184246 | 7/1996 | (JP) . |
| 08247134 | 9/1996 | (JP) . |
| 09170372 | 6/1997 | (JP) . |
| 09243970 | 9/1997 | (JP) . |
| 09280248 | 10/1997 | (JP) . |
| 10153214 | 6/1998 | (JP) . |
| 11030226 | 2/1999 | (JP) . |

* cited by examiner

*Primary Examiner*—Jack Chiang
(74) *Attorney, Agent, or Firm*—Hoffman & Baron, LLP

(57) ABSTRACT

The present invention relates to a hinge device comprising: a casing having a projection hole; a cam provided in the casing, the cam being rotatable with respect to a rotational axis, movable in the direction of the rotational axis, and undetachable from the casing, the cam having a projection projecting through the projection hole and a cam face surrounding the rotational axis; a flat spring for holding the cam face; a base movable in the direction of the rotational axis, the cam being rotatably attached to the base; and a pressing spring for urging the cam and the base toward the direction of the projection.

19 Claims, 14 Drawing Sheets

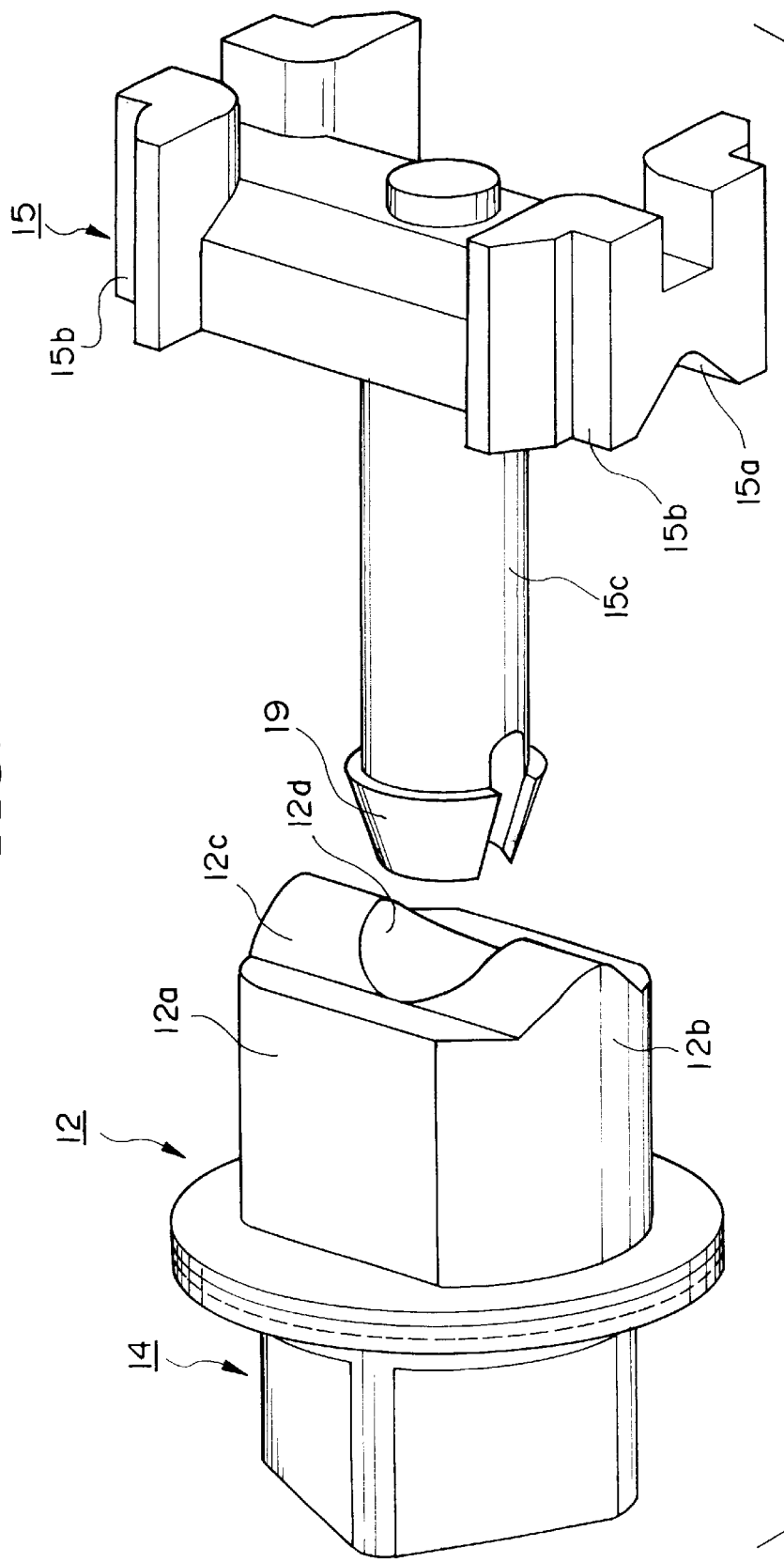

HINGE DEVICE

BACKGROUND OF THE INVENTION

1. Field of the Invention

This invention relates to a hinge device, and in particular, to a hinge device for a portable electronic device.

This application is based on Japanese Patent Applications No. Hei 10-344694 and Hei 11-132005, the contents of which are incorporated herein by reference.

2. Background Art

Various types of compact electronic devices such as cellular telephones, portable computers (with or without a communication function), electronic note-books, and game computers have come into general use with advances in electronics technology in recent years. These compact devices have flip members (hereinafter referred to as flip-type electronic device), which can be closed when the device is carried, and can be open to a specific size to make the device easy to operate when the device is in use.

For example, a cellular telephone has a flip member which can be opened and closed. Recently, a detachable flip member has become in wide demand.

To make the flip member detachable from the device main body, the lip member is attached to the device main body by means of a hinge device. The conventional hinge device becomes complicated and large because it must includes a mechanism to maintain the flip member at a predetermined angle when the flip member is opened and closed. To reduce the size of the hinge device, the hinge device must be simplified, and as the result, the flip member cannot be securely held at the predetermined angle. In addition, electrical connections between the device main body and the flip member cannot be established in a small limited space. When the detachable mechanism for the flip member is equipped with the conventional hinge device, these problems become more serious. Therefore, an improved hinge device, which reduces its size while maintaining the mechanisms for securely holding the flip member, for making the flip member detachable, and for establishing the electrical connections, become in demand.

SUMMARY OF THE INVENTION

It is therefore an object of the present invention to provide a hinge device which has a simplified structure, securely holds a flip member, and reduces the size of the hinge device.

In one aspect of the present invention, the hinge device comprises: a casing having a projection hole; a cam provided in the casing, the cam being rotatable with respect to a rotational axis, movable in the direction of the rotational axis, and undetachable from the casing, the cam having a projection projecting through the projection hole and a cam face surrounding the rotational axis; a flat spring for holding the cam face; a base movable in the direction of the rotational axis, the cam being rotatably attached to the base; and a pressing spring for urging the cam and the base toward the direction of the projection. One of the cam and the base has a rotation stopper, and the other has a concavity for receiving the rotation stopper.

According to the present invention, when the rotation stopper is engaged with the concavity, the rotation is inhibited, preventing slippage of the shaft from a predetermined angle due to a shock. This is advantageous when the hinge device is applied to a flip-type portable phone with a flip member, because the present invention increases the holding force for maintaining the flip member opened at a predetermined angle. The rotation stopper engaged with the concavity can be released by rotating the cam relative to the base so that the base is pushed against the biasing force by the pressing spring toward the rear.

The hinge device of the present invention further comprises a engaging mechanism for engaging the base with the casing to prevent rotation of the base relative to the casing.

The engaging mechanism prevents the base from being rotated relative to the casing and limits the movement of the base so that the base cannot further move to the front. Although the pressing spring urges the base toward the front, the base cannot further move to the front. Therefore, the biasing force toward the front does not act on the cam which is positioned in front of the base. That is, the cam is not pressed onto the casing, thereby preventing occurrence of friction between the cam and the casing.

The engaging mechanism comprises a slit made in the casing, and a projection formed on the base, and the projection is inserted through the slit.

The engaging mechanism of the slit in the casing and the projection of said base simplifies the structure of the hinge device, can be easily manufactured, and can be easily positioned when assembled.

A pair of the flat springs having L-shapes are provided. The ends of the flat springs are fixed to the base, while the other ends of the flat springs are in contact with the cam face, and the two flat springs are positioned opposite to each other on both sides of the cam. The pressing spring is in contact with the flat springs so that the pressing force is converted by way of the flat spring into a force to close the flat springs.

Alternatively, the flat spring may have a U-shape, a middle portion of the flat spring is fixed to the base, and both ends of the flat spring are in contact with the cam face. The pressing spring is in contact with the flat springs so that the pressing force is converted by way of said flat spring into a force to close said flat springs.

By increasing the pressing force by the pressing spring, the closing force of the flat spring is increased. The increased closing force produces a large torque on the cam faces. Although the hinge device of the present invention is small, it can produce a torque on the cam faces to make the operation of the flip member stable.

The cam has a shaft hole extending on the rotational axis, and the base has a shaft inserted in the shaft hole so that the cam is rotatable relative to the base. Thus, the base supports the rotatable cam, and makes the rotation of the cam stable, preventing misalignment of the cam.

The casing has a slit and a stopper face at one end of the slit, and the base has a main base which is inserted through the slit and which is movable in the slit. The slit is engaged with the base, preventing the rotation of the base relative to the casing. Therefore, the cam can be rotated relative to the casing, and the rotation of the cam becomes more stable. Further, this engaging mechanism is quite simple, thereby simplifying the manufacturing and assembly process of the hinge device.

The flat spring has a claw inserted in the slit. The flat spring is engaged with the slit so that the rotation of the flat spring relative to the casing is inhibited. Therefore, the flat spring can hold the cam securely at a predetermined position.

The flat spring has a claw, and the base may have a concavity for engaging with the claw. Only the base is in contact with the slit while the flat spring is not in contact with the slit. The rotation of the flat spring relative to the casing is still inhibited. When the base is made of a material (for example, plastic) easy to slip along the casing, the cam can be smoothly moved forward and backward (in the direction of the rotational axis).

A through-hole may be made through the base and the cam. Through this through-hole, electrical connections between the flip member and the device main body can be established.

According to the present invention, the hinge device is simplified, can hold the flip member securely, and can reduce the size. Further, this invention makes the manufacturing and assembling process easy, and enhances the durability and reliability of the hinge device. In addition, this invention maintains the detachable mechanism and the mechanism for establishing electrical connections.

BRIEF DESCRIPTION OF THE DRAWINGS

FIG. 1A shows a top view of the hinge device, and FIG. 1B shows a front view of the hinge device.

FIG. 4 is a perspective view showing the projection, the cam, and a shaft base of the hinge device of the present invention.

FIG. 6A shows an engaged state, and FIG. 6B shows a released state.

FIG. 7A is a top view of the flip member, and FIG. 7B is a front view of the flip member.

FIG. 8A shows a front view of the portable electronic device, and FIG. 8B shows a front view of the portable electronic device.

FIG. 10A shows a front view of the hinge device, and FIG. 10B is a left side view of the hinge device.

FIG. 14A shows a top view of the hinge device, FIG. 14B shows a side view of the hinge device, and FIG. 14C shows a front view of the hinge device.

FIG. 16A shows a top view of the flat spring, FIG. 16B shows a front view of the flat spring, and FIG. 16C shows a side view of the flat spring.

FIG. 18A shows a top view of the flat spring, FIG. 18B shows a front view of the flat spring, and FIG. 18C shows a side view of the flat spring.

DETAILED DESCRIPTION OF THE PREFERRED EMBODIMENTS

Referring to Figures, the best mode of the hinge devices according to the present invention will be explained.

First Embodiment

Figure 1A:
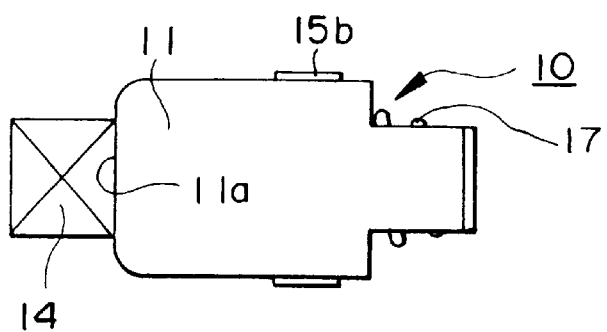
FIGS. 1A and 1B are diagrams showing the hinge device of the first embodiment according to the present invention.
Figure 1B:
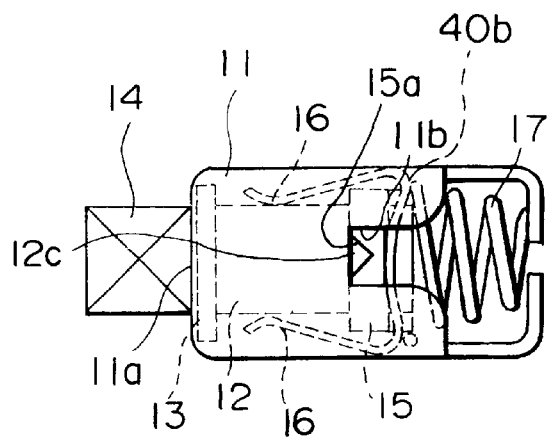

FIGS. 1A and 1B show the first embodiment. The hinge device 10 comprises a casing 11, a cam 12, an engaging portion 13, a projection 14, a shaft base (or bearing) 15, a flat spring (plate spring) 16, and a pressing spring 17.

The casing 11 is an approximately rectangular hollow case. A projection hole 11a is made in the front side of the casing 12, and stopper slits 11b are made in both sides of the casing 11.

The casing 11 includes the cam 12 which has a cam face surrounding the rotational axis. The cam 12 has the shape, for example, shown in FIG. 2. The cam 12 is axially symmetrical with respect to the rotational axis O. The cam face is composed of holding faces 12a and restoring force receiving faces 12b.

The operation by the cam 12 will be explained when this invention is applied to the portable electronic device. When a flip member is opened from a device main body, the flip member is positioned at position A. In this situation, the flat spring 16 holds the holder faces 12a so that the flip member is stably held at an opening angle β (for example, 120 degrees) from the main body.

When the flip member is closed on the main body, the flip member is positioned at position C. In this situation, the flat spring 16 holds the restoring force receiving faces 12b. The restoring force receiving faces 12b are positioned inside a virtual circumference D having the center corresponding to the rotational axis O. Therefore, a torque to close the flip member acts on the flat spring 16 so that the flip is biased toward the closed position.

When the flip member is opened from the closed position, that is, when the flat spring 16 is rotated clockwise, the flip member passes position B and quickly (automatically) moves to the opened position. Although the flat spring 16 seems to be rotated, the cam 12 is in fact rotated. That is, one of the cam 12 and the flat spring 16 may be relatively rotated with respect to the other. The rotation angle α is set to, for example, 30 degrees.

The cam 12 has a rotation stopper 12c which projects to the rear to stop the rotation, as shown in FIG. 1. The rotation stopper 12c has a triangular cross-section and extends in the direction perpendicular to the rotational axis O.

A stopper 13 wider than the projection 11a is integrally formed on or coupled to the front portion of the cam 12.

Figure 3:
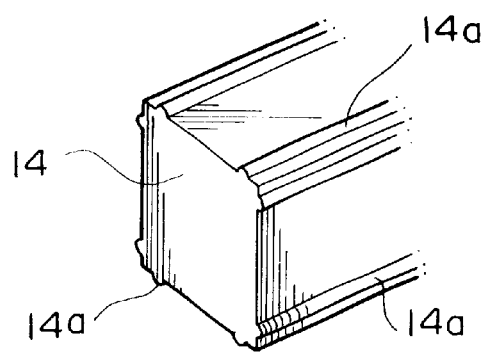
FIG. 3 is a perspective view showing a projection of the hinge device of the present invention.

The projection 14 is integrally formed with or coupled to the front portion of the stopper 13, and projects through the projection holes 11a. The projection 14 has a rectangular cross-section to prevent slipping. As shown in the enlarged view of FIG. 3, the projection 14 has thread ribs 14a extending in the direction corresponding to the rotational axis. While the shapes, number, and positions of the thread ribs 14a may be appropriately determined, this embodiment has two thread ribs at each corner, that is, eight thread ribs in total at the corners. When the projection 14 is inserted in a corresponding mounting hole, the thread ribs 14a are tightly fit in the hole, thereby enhancing the connection strength. In addition, the edges of the projection 14 may be round.

The shaft base 15 is positioned at the back of the cam 12 within the casing 11. The shaft base 15 has a concavity 15a which receives the rotation stopper 12c. The shaft base 15 has two engaging projections 15b inserted through the engaging slits 11b in both sides of the casing 11. The engaging projections 15b slightly project from the sides of the casing 11 through the engaging slits 11b, preventing the shaft base 15 from being rotated relative to the casing 11 and limiting the movement of shaft base 15 so that the shaft base 15 cannot further move to the front. While the engaging projections 15b are engaged with the engaging slits 11b, the shaft base 15 can be freely moved toward the rear. The engaging projections 15b do not necessarily project from the sides of the casing 11, and the ends of the engaging projections 15b may correspond to the sides of the casing 11 to make the sides flat.

The shapes of the projection 14, the cam 12, and the shaft base 15 can be clearly understood from the perspective view of FIG. 4. In FIG. 4, the thread ribs 14 are omitted, and the holder faces 12a is not concave but flat, as one example. The shaft base 15 has a shaft 15c corresponding to the rotational axis O. The cam 12 has a through-hole 12d through which the shaft 15c is inserted. The shaft 15c and the through-hole 12d support the smooth rotation of the cam 12 relative to the shaft base 15 with respect to the rotational axis O, preventing misalignment of the shaft 15c.

Further, at the front tip of the shaft 15c, an elastic hook 19 whose diameter is greater than the shaft 15c is formed. A slit is made in the tip of the elastic hook 19, which can be elastically narrowed. During the insertion of the hook 19 through the through-hole 12d, the hook 19 is elastically deformed. After the hook 19 has been inserted to the maximum depth, the hook 19 is caught by a step (not shown) inside the through-hole 12d.

Figure 5A:
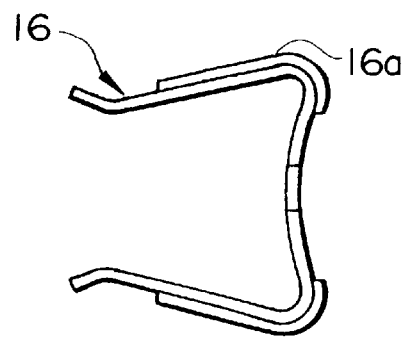
FIGS. 5A to 5C are enlarged views showing a flat spring of the hinge device of the present invention.
Figure 5B:
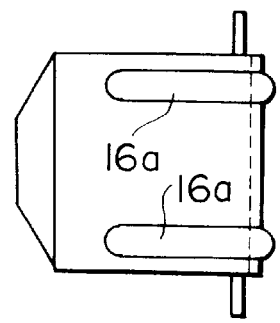
Figure 5C:
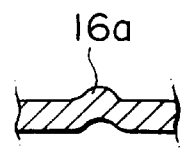

Referring to FIG. 5, the flat spring 16 has a U-shape providing a biasing force to close the flat spring, and is positioned at the back of the shaft base 15. Free ends of the flat spring 16 press the cam face (the holder faces 12a or the restoring force receiving faces 12b) from the direction perpendicular to the rotational axis O. Thus, the flat spring 16 produces the torque depending on the shape of the cam face in contact with the free ends of the flat spring 16.

Along both edges of the flat spring 16, extended rising portions (beads) 16a rise from the surface of the flat spring 16. The rising portions 16a enhance the flexural strength of the flat spring 16, and enhance the durability of the hinge device 10.

The pressing spring 17 is positioned at the back of the cam 12 within the casing 11.

Figure 6A:
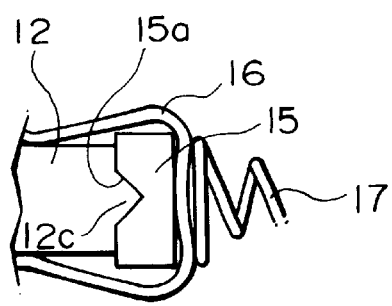
FIGS. 6A and 6B are diagrams showing the engagement between the cam and the shaft base of the present invention, in which a casing is omitted.

As explained above, the hinge device 10 has the rotation stopper 12c on the cam 12 and the concavity 15a in the shaft base 15. When the rotation stopper 12c is inserted in the concavity 15a, resistance is caused that inhibits the rotation of the cam 12 relative to the shaft base 15. This prevents slippage of the shaft from a predetermined angle due to a shock (shown in FIG. 6A).

Figure 6B:
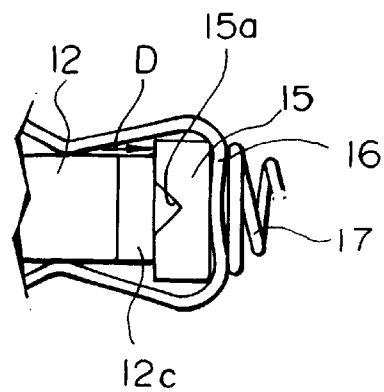

As shown FIG. 6B, the rotation stopper 12c engaged with the concavity 12a can be released when the cam 12 is rotated relative to the shaft base 15 so that the shaft base 15 is pushed against the biasing force by the pressing spring 17 toward the rear, as indicated by the arrow D. The force to release the rotation stopper 12c may be adjusted by changing the angle of its triangular shape. The rotation stopper 12c may employ another shape to adjust the force to release the rotation stopper 12c.

Further, the engaging projections 15b of the shaft base 15 are engaged with the engaging slits 11b of the casing 11 to limit the movement of the shaft base 15 so that the shaft base 15 cannot move further to the front. Therefore, the biasing force by the pressing spring 17 does not act on the cam 12 in front of the shaft base 15. That is, the cam 12 is not biased to the front by the pressing spring 17. Therefore, the cam 12 is not pressed onto the casing 11, preventing occurrence of friction between the cam 12 and the casing 11.

By pushing the projection 14 toward the rear, the projection 14 can be retracted against the biasing force by the pressing spring 17. Therefore, the hinge device 10 is detachable when retracting the projection 14.

One example of the flip member using the hinge device 10 will be explained.

Figure 7A:
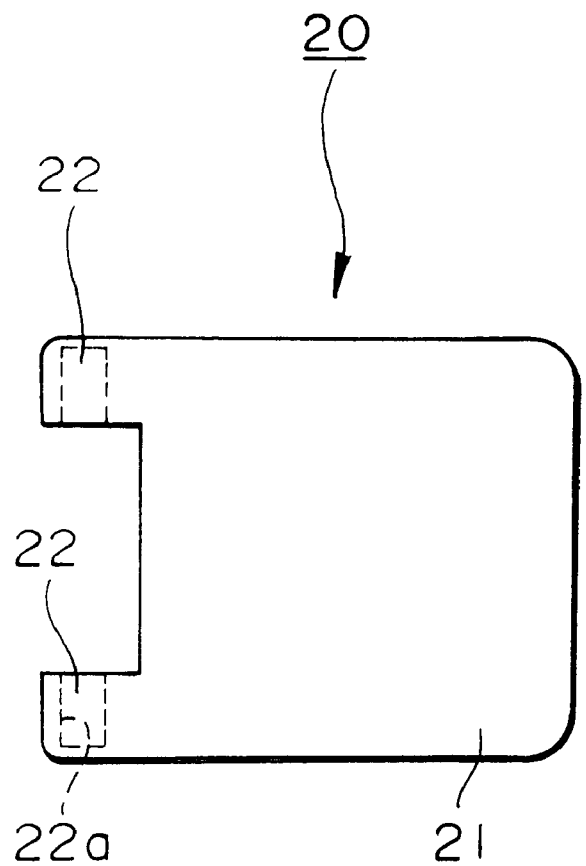
FIGS. 7A and 7B show a flip member of the present invention.
Figure 7B:
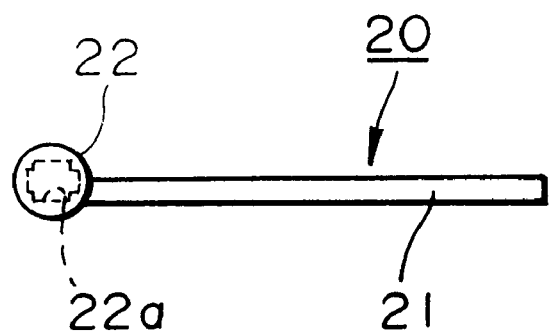

As shown in FIG. 7, the flip member 20 has a flip body 21 and attachments 22.

The attachments 22 project from and are integrally formed with both corners of the flip body 21. Approximately rectangular mounting holes 22 are made in the attachments 22. The mounting holes 22a are slightly smaller than the casing 11 of the hinge device 10.

The hinge devices 10 are inserted in the mounting holes 22 and are fixed to the flip member 20. The hinge devices 10 are tightly fit in the mounting holes 22a because the hinge devices 10 are forcibly inserted into the slightly smaller mounting holes 22.

Because of the small hinge devices 10, the size of the flip member 20 can be reduced. Particularly, because the hinge device 10 is small in diameter, the flip member 20 becomes thin.

A portable phone with the flip member 20 will be explained.

Figure 8A:
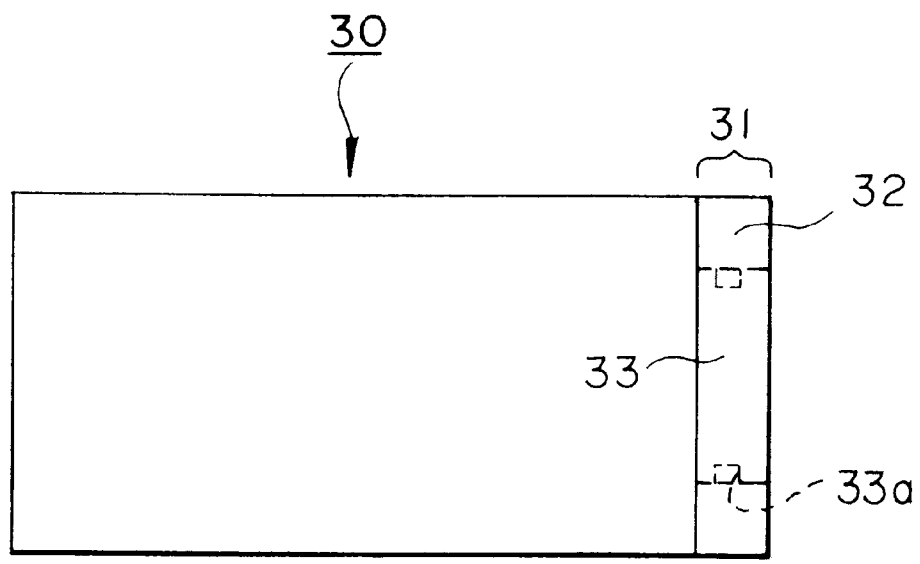
FIGS. 8A and 8B are diagrams showing an outline of the portable electronic device of the present invention.
Figure 8B:
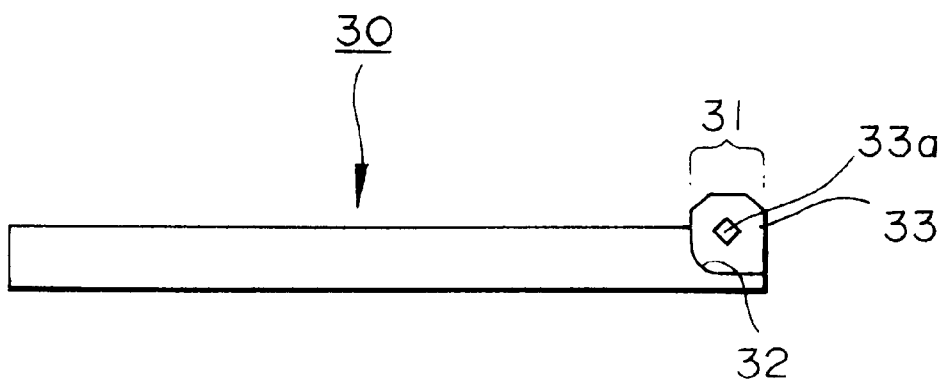

As shown in FIGS. 8A and 8B, the portable phone 30 has an attachment 31 at its edge.

The attachment 31 comprises concavities 32 and a center expanding portion 33, and is complementary to the attachments 22 of the flip member 22.

Mounting holes 33a are made in both ends of the center expanding portion 33. The shape and size of the mounting holes 33a are determined depending on the projection 14 of the hinge devices 10.

Figure 9:
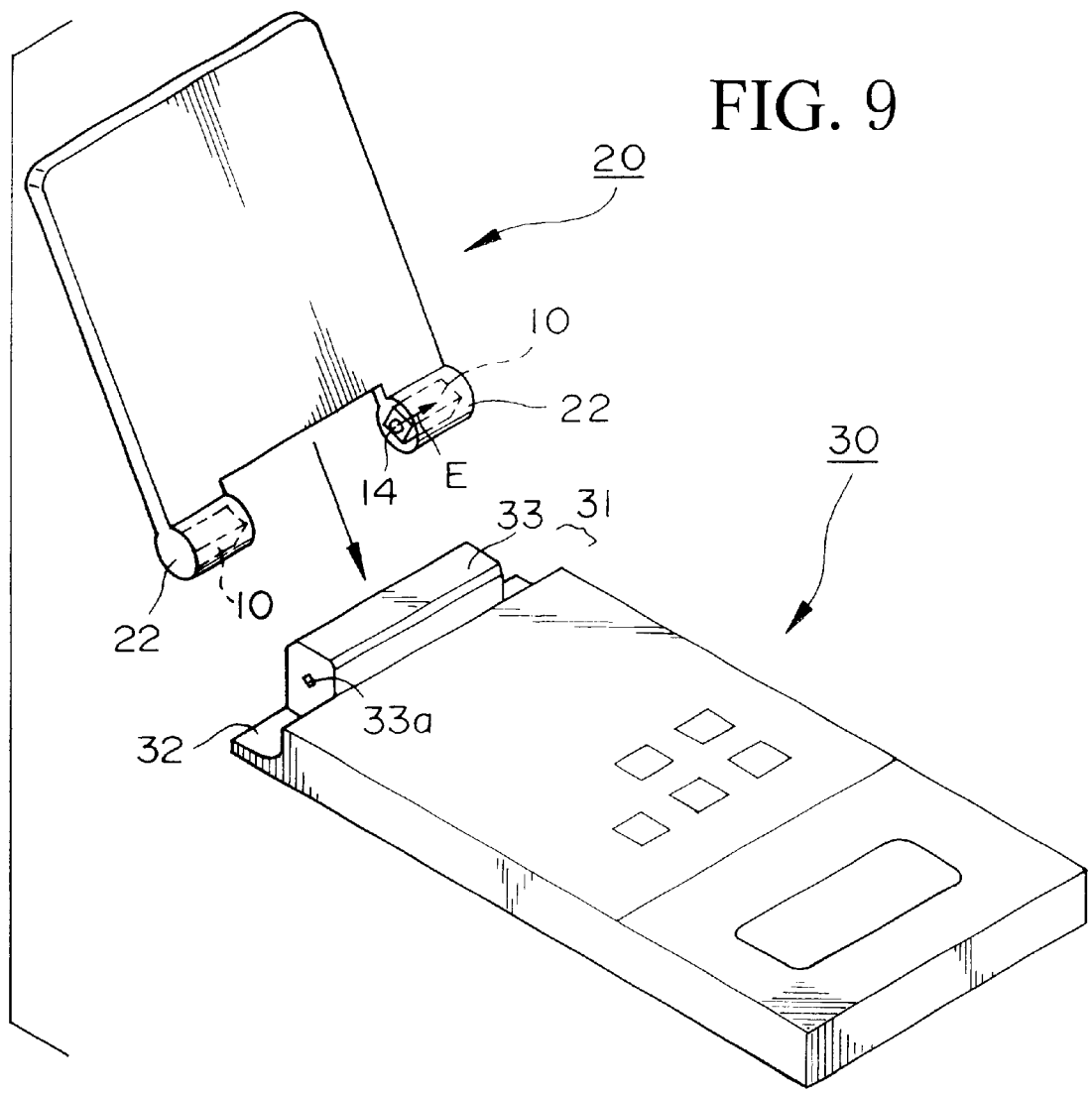
FIG. 9 is a perspective view showing a process for attaching the flip member to the portable electronic device.

FIG. 9 shows a process for mounting the flip member 20 to the portable phone 30. The hinge devices 10 are fixed to the attachments 22 of the flip member 20 so that the projections 14 project inwardly. By means of the detachable mechanism of the hinge device 10, that is, by retracting the projections 14 in the direction indicated by the arrow E, the flip member 20 can be mounted to the portable phone 30, and then the biasing force due to the pressing spring 17 urges and restores the projections 14 to connect the flip member 20 to the portable phone 30.

The flip member 20 may be detached only in the manufacturing and maintenance process. Alternatively, the user may detach the flip member 20 at will.

Figure 2:
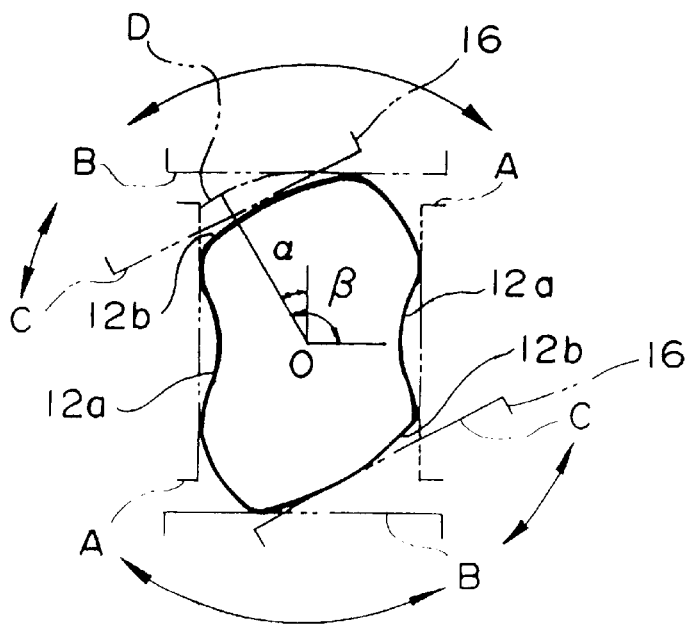
FIG. 2 is a cross-sectional view showing a cam in the hinge device of the present invention.

The cam operation of the flip member 20 attached to the portable phone 30 is similar to that described in FIG. 2.

Preferably, when the flip member 20 is opened at a predetermined angle (for example, 120 degrees) from the portable phone 30, the rotation stopper 12c is engaged with the concavity 15a. The rotation stopper 12 and the concavity 15a, engaged with each other, prevent slippage of the shaft and increase the force holding the opened flip member 20.

Second Embodiment

Figure 10A:
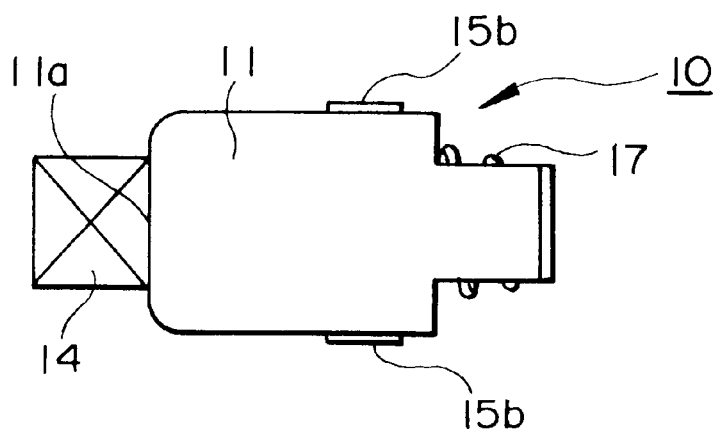
FIGS. 10A and 10B are diagrams showing the hinge device of the second embodiment according to the present invention.
Figure 10B:
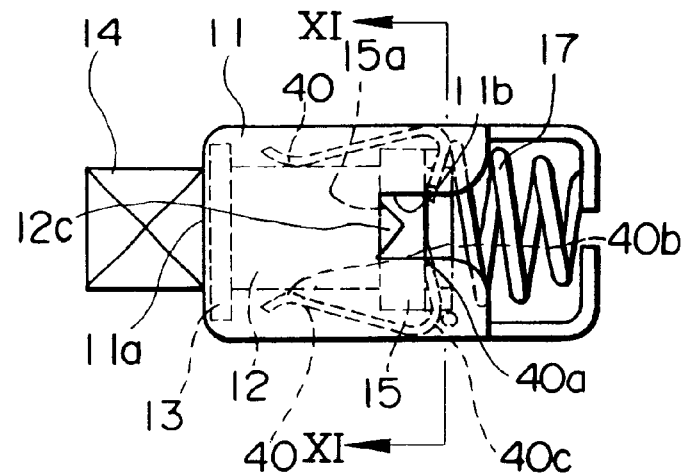

FIGS. 10A and 10B show the second embodiment of the present invention. Except for two modified flat springs, the second embodiment is identical to the first embodiment.

The two flat springs 40 have an L-shape. Base ends of the two flat springs 40 are fixed to points 40a on the shaft base 15, and the other free ends of the flat springs 40 are in contact with points 40b on the cam face from the direction perpendicular to the rotational axis O, so that the two flat springs 40 face each other, that is, are positioned opposite to each other. Bent portions 40c of the flat springs 40 are movable and are positioned at the back of the fixed portions 40a.

Figure 11:
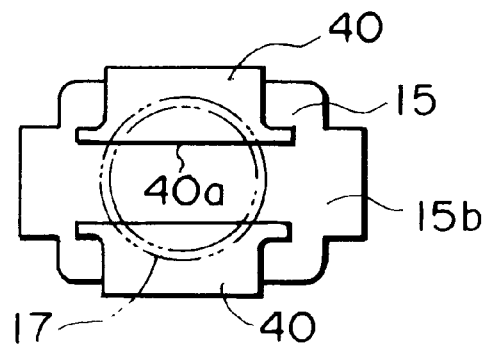
FIG. 11 is a cross-sectional view along the line XI—XI in FIG. 10B.
Figure 12:
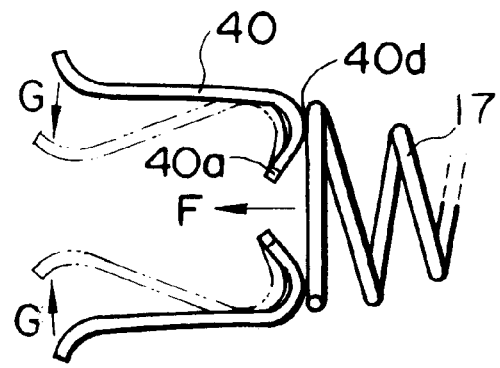
FIG. 12 is a diagram for explaining the operation of the hinge device of the present invention.

As shown in FIG. 11, the pressing spring 17 is in contact with the flat spring 40 at points radially outside the fixed portions 40a, and biases the flat springs 40 toward the front along the rotational axis. As shown in FIG. 12, the pressing force F toward the front by the pressing spring 17 is converted into the force G to urge the flat springs 40 inwardly (closing force) by way of the fixed portions 40a as the fulcrums. As the result, the flat springs 16 hold the cam faces of the cam 12 from the direction perpendicular to the rotational axis O. Thus, the flat springs 40 produce a torque depending on the shapes of the cam faces in contact with the free ends of the flat springs 40. Thus, the pressing spring 17, the points of action 40d (functioning as the power points in the leverage operation) of the pressing force by the pressing spring 17, the fixed portions 40a (functioning as the fulcrums in the leverage operation), and the contact portions 40b (functioning the points of action in the leverage operation) constitute a conversion mechanism for converting the pressing force by the pressing spring 17 into the closing force of the flat springs 40.

As explained above, the hinge device 10 converts the pressing force F by the pressing spring 17 into the closing force G of the flat springs 40 by way of the fixed portions 40a as the fulcrums. Accordingly, by increasing the pressing force by the pressing spring 17, the closing force by the flat springs 40 can be easily increased. The increased closing force produces a large torque on the cam face. Although the hinge device of the present invention is small, it can produce a large torque on the cam face that makes the operation of the flip member stable.

The other advantages obtained by this second embodiment are similar to those of the first embodiment. When the second embodiment is applied to the flip member or the portable phone, the same advantages as those of the first embodiment can be obtained.

Third Embodiment

Figure 13:
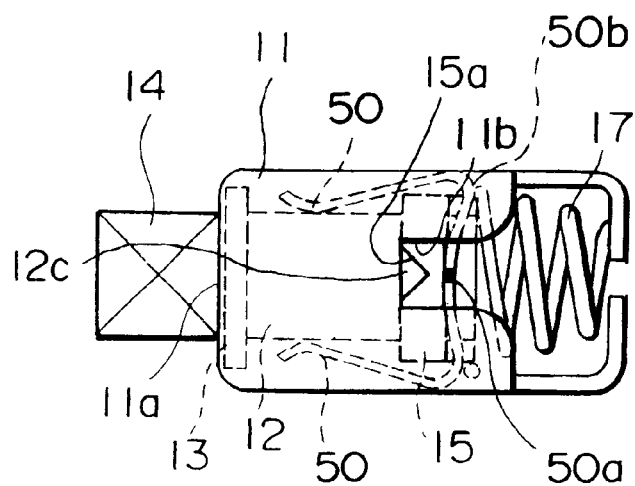
FIG. 13 is a left side view showing the hinge device of the third embodiment according to the present invention.

FIG. 13 shows the third embodiment of the present invention. Except for the arrangement of the flat spring, the other structure of the third embodiment, which includes the shape of the flat spring, is identical to that of the first embodiment.

As shown in FIG. 13, the middle portion 50a of the flat spring 50 is fixed to the shaft base 15. It should be noted that bent portions 50b of the flat spring 50 are movable and are positioned at the back of the fixed portion 50a.

In the third embodiment, the flat spring 50 has an inherent closing force. In addition to this inherent closing force, the additional closing force converted from the pressing force by the pressing spring 17 also acts on the cam faces as the holding force. Therefore, although the hinge device of the present invention is small, it can produce a large torque on the cam faces.

The other advantages of the third embodiment are the same as those of the first embodiment.

The present invention is not limited to the above embodiments, and may employ the following structures:

(a) The hinge device of the present invention may be applied to general electronic devices other than the portable phone.

(b) The hinge device of the present invention may be applied to flip members and bodies of a portable computer, a electronic notebook, and an electronic game device.

(c) The hinge device of the present invention may be provided in the device body of the portable electronic device instead of the flip member.

(d) The projection 14 of the hinge device 10 may have a shape different from that shown in the Figures.

(e) The cam of the hinge device 10 may have a shape different from that shown in FIG. 2.

Fourth Embodiment

The fourth embodiment of the present invention will be explained with reference to FIGS. 14 to 17.

Figure 14A:
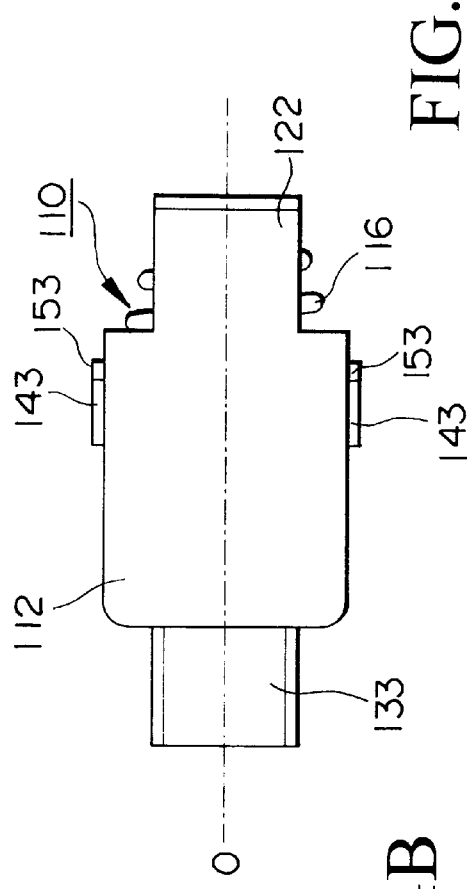
FIGS. 14A to 14C are diagrams showing the hinge device of the fourth embodiment according to the present invention.
Figure 14C:
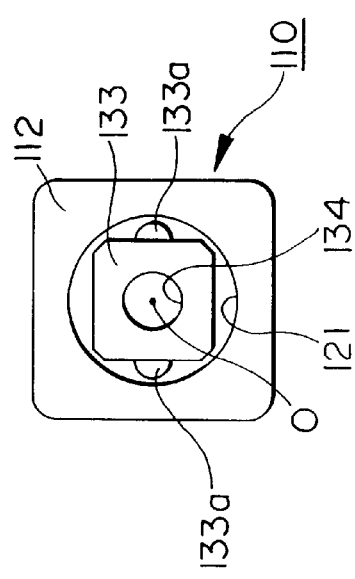
Figure 14B:
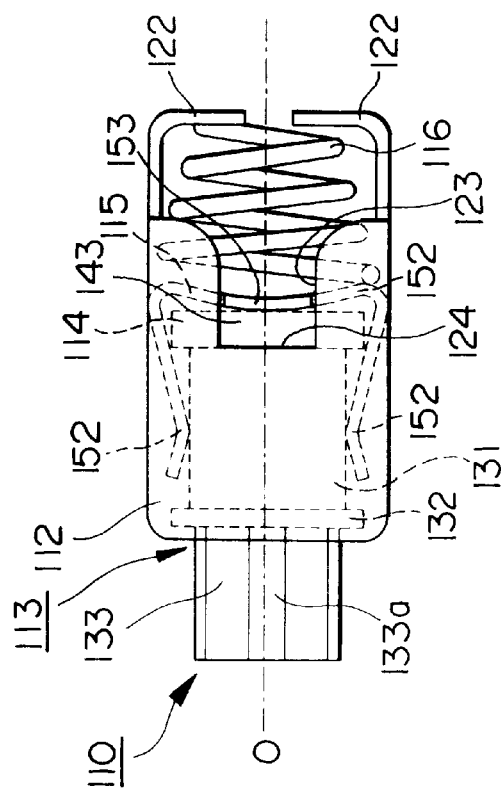

FIGS. 14A to 14C show the fourth embodiment. FIG. 14A is a top view, FIG. 14B is a side view, and FIG. 14C is a front view of the hinge device. As shown in these Figures, the hinge device 110 comprises a casing 112, a cam 113, a shaft 114, a flat spring (plate spring) 115, and a pressing spring 116.

Figure 16A:
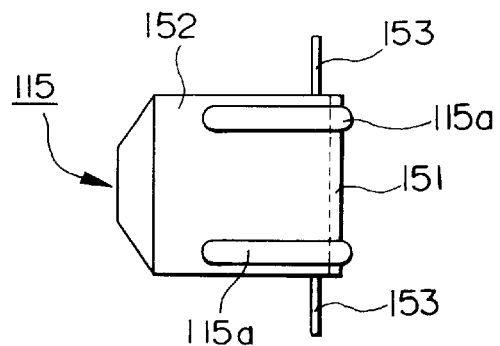
FIGS. 16A to 16C are diagrams showing a flat spring of the hinge device of the present invention.
Figure 16B:
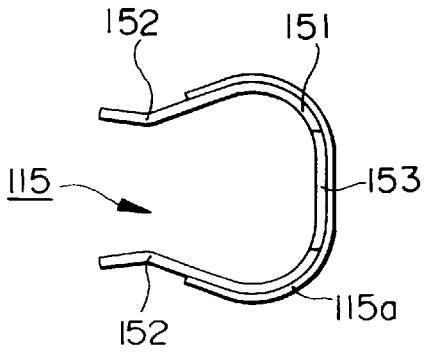
Figure 16C:
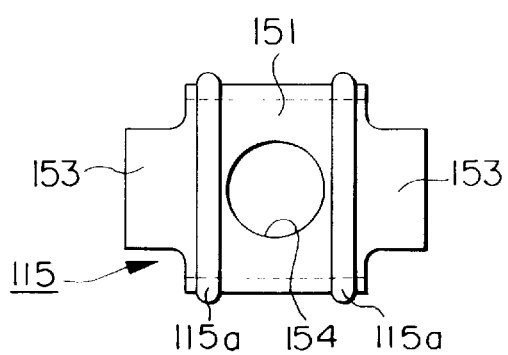
Figure 17:
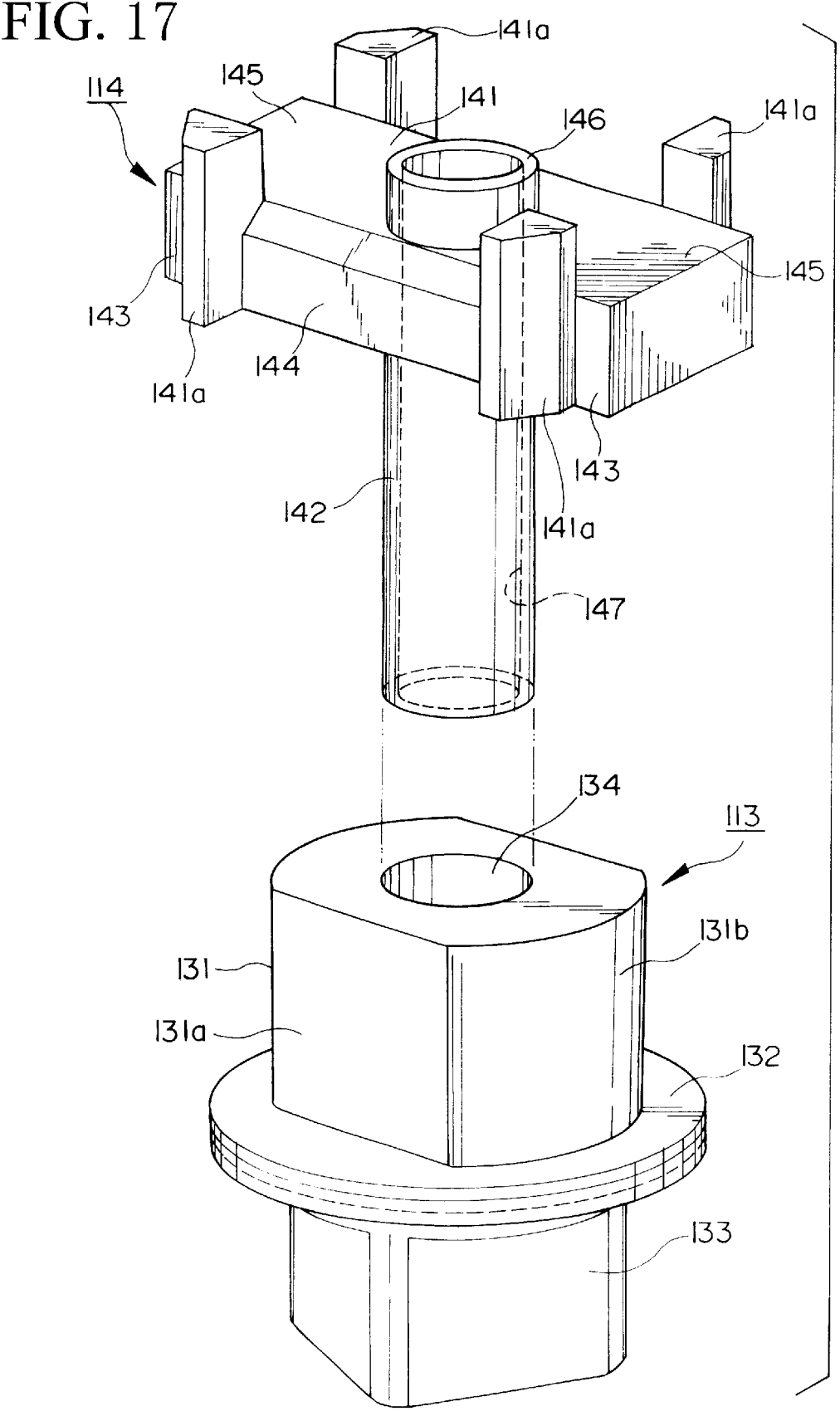
FIG. 17 is a perspective view showing the cam and a shaft base of the hinge device of the present invention.

FIGS. 16A to 16C show the flat spring 115 in the embodiment, and FIG. 17 shows the cam 113 and the shaft 114.

The casing 112 includes the cam 113, the shaft base 114, the flat spring 115, and the pressing spring 116. The casing 112 is an approximately rectangular hollow case. A projection hole 121 is made in the side (front side) of the casing 112 from which a part of the cam 113 projects. From the opposite side to the projection side, stopper plates 122 project and hold the rear end of the pressing spring 116, which is thereby prevented from falling off.

In both sides of the casing 112, stopper slits 123 are made for holding stopper projections 143 of the shaft base 114 and claws 153 of the flat spring 115, which are movable in the direction of the rotational axis O. The stopper slits 123 have stopper faces 124 at their front ends, and are vacant from the stopper faces 124 to the rear side. The movement of the shaft base 114 and the flat spring 115 are limited by the stopper faces 124 so that they cannot move further to the front.

The cam 113 comprises a cam face 131, a flange 132, and a projection 133, which are coupled together (or integrally formed) and are rotatable with respect to the rotational axis O. The cam 113 has a through-hole 134 corresponding to the rotational axis O.

Figure 15:
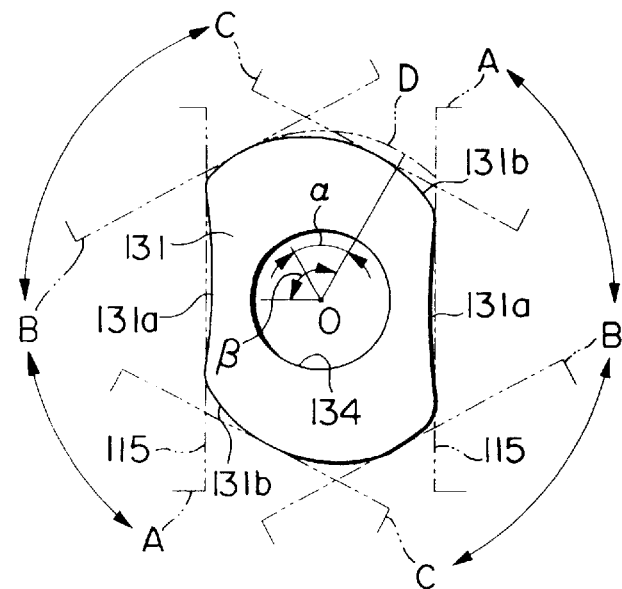
FIG. 15 is a cross-sectional view showing a cam in the hinge device of the present invention.

The cam face 131 surrounds the rotational axis O. FIG. 15 shows a cross-section at the cam face 131. The cam face 131 is axially symmetrical at the cross-section perpendicular to the rotational axis O. The cam face 131 has holder faces 131a and restoring force receiving faces 131b.

The holder faces 131a and the restoring force receiving faces 131b are held by the flat spring 115 from the direction perpendicular to the rotational axis O.

The cam operation using the cam faces 131 of the hinge device 110, which is applied to a portable electronic device, will be explained with reference to FIG. 15.

When a rotatable flip member, for example, a screen containing section of a laptop computer or a cover of portable phone, is opened from a device main body, and the flip member is positioned at a position A. At the position A, the flat spring 115 holds the holder faces 131a so that the flip member is stably held at an opening angle β (for example, 120 degrees) from the device main body.

When the flip member is closed on the device main body, the flip member is positioned at a position C. In this situation, the flat spring 115 holds the restoring force receiving faces 131b. The restoring force receiving faces 131b are positioned and inclined inwardly from a virtual circumference D. Therefore, a rotational torque to close the flip member occurs on the cam face 131 so that the flip member is biased toward the closed position.

When the flip member is opened from the closed position, that is, when the flat spring 115 is rotated in the anti-clockwise direction in FIG. 15 (the cam face 131 is in fact rotated), the flip member passes the position B, then quickly moves to the open position A. The angle α between the positions A and B is, for example, 60 degrees.

The flange 132 has an approximately disc shape, and is coupled and fixed to the front side of the cam face 131. The flange 132 has a diameter greater than that of the projection hole 121, so that the projection 133 projects through the projection hole 121 from the casing 112 while the cam face 132 remains within the casing 112. Therefore, the cam 113 cannot be pulled out from the casing 112.

The projection 133 is integrally formed with (or is coupled and fixed to) the front side of the flange 132. The projection 133 projects through the projection hole 121, and has a rectangular column shape to prevent its rotation when the projection 133 fits in a hole in the main device.

The projection 133 has ribs 133a extending in the direction of the rotational axis as shown in FIG. 14C (but omitted in FIG. 17). The shapes, numbers, and positions of the ribs 133a may be appropriately determined, and in the embodiment, there are two ribs 133a on the opposite sides. The ribs 133a enhance the degree of fitness of the projection 133 when the projection 133 is inserted into the corresponding hole.

The shaft base 114 comprises a main base 141, and a shaft 142 protruding toward the front. The shaft base 114 is arranged in the casing 112 so that the main base 141 is positioned in the rear side opposite to the cam 113. The shaft 142 is inserted through the through-hole 134 of the cam 113 so that the cam 113 is rotatable.

The main base 141 can move forward and backward within the casing 112 while guides 141a at both edges of the main base 141 are in contact with the inner surfaces of the casing 112. The guides 141a allows the shaft 142 to stably move forward and backward along the rotational axis O, preventing misalignment of the shaft 142.

The main base 141 has the stopper projections 143 which are to be inserted through the stopper slits 123 of the casing 112. The stopper projections 143 projects slightly through the stopper slits 123, inhibits the rotation of the shaft 114 relative to the casing 112, and allows the shaft 114 to move forward and backward behind the stopper faces 124. Further, the main base 141 defines spaces 144 through which the flat spring 115 extends from the backside of the main base 141 to the front. The main base 141 has engagers 145 engaged with the claws 153 of the flat spring 115 to prevent the rotation of the flat spring 115 relative to the shaft base 114. Further, in the rear side of the main base 141, a projection 146 engaged with an engaging hole 154 of the flat spring 115 is made.

The shaft 142 is cylinder, and is inserted through the through-hole 134 of the cam 113 so that the cam 113 can rotate around the rotational axis O.

The shaft base 114 has a through-hole 147 corresponding to the rotational axis O through the shaft 142, the main base 141, and the projection 146. Through this through-hole 147 of the shaft base 141, electrical connections between the parts can be established. The projection 146 separates the connections from the flat spring 115, thereby reducing the danger of a short-circuit.

The flat spring 115 has a U-shape providing a biasing force in the direction to close the flat spring 115. The flat spring 115 has a fixed portion 151 and free ends 152. The fixed portion 151 is arranged on the back side of the shaft base 114, and the free ends 152 extend through the spaces 144 adjacent to the shaft base 114 to the front.

From the fixed portion 151, the claws 153 project, corresponding to the engagers 145 of the shaft base 114. The claws 153 are engaged with the engaging slits 123 of the casing 112 and with the engagers 145. Therefore, the flat spring 114 can move forward and backward together with the shaft base 114, while the rotation of the flat spring relative to the casing 112 and the shaft base 114 is inhibited. On the rotational axis O, a hole 154 is made in the fixed portion. The projection 146 of the shaft base 114 is inserted through the hole 154 so that the through-hole 147 extends through the engaging hole 154.

The free ends 152 extend to the cam face 131 of the cam 113, and hold both sides of the cam face 131 (the holder faces 131a, or the restoring force receiving faces 131b) from the direction perpendicular to the rotational axis O. The free ends 152 generate a torque depending on the shapes of the contact portions of the cam face 131.

At both edges of the flat spring 115, extended rising portions (beads) 115a rising from the surface of the plate extend between the free ends 152 through the fixed portion 151. The extended rising portions 115a enhance the flexural strength of the flat spring 115, and enhance the durability of the hinge device 110.

Although not shown in Figures, the flat spring 115 comprises a plurality of plates to hold the cam 113 tightly. In this embodiment, three plates are layered as the flat spring 115.

The pressing spring 116 is a coil spring, and is located at the rear side of the flat spring 115 to bias the cam 113, the shaft base 114, and the flat spring 115 toward the front. The rear end of the pressing spring 116 is held by the engaging plates 122 of the casing 112.

In the hinge device 110 described above, the pressing spring 116 biases the cam 113 and the shaft base 114. When an external force greater than the biasing force by the pressing spring 116 is applied to the projection 133, the projection 133 can be retracted into the casing 112. Therefore, when the hinge device 110 is applied to a flip type portable electronic device with the flip member, a flip member can be detachable.

The shaft base 114 and the flat spring 115 are engaged with the engaging slits 123, and cannot be rotated relative to the casing 112. Therefore, the cam 113 can be stably rotated relative to the casing 112, preventing misalignment of the cam 113 from the rotational axis. Further, this mechanism is simple, makes the manufacturing and assembling process of the device easy, reduces the size of the hinge device, and simplifies the entire construction of the hinge device.

Furthermore, because the through-hole 147 extends through the shaft base 114 and the flat spring 115, the electrical connections can be established through the hinge device. When the hinge device is applied to a flip type portable electronic device, the device and the top are electrically connected, reducing the danger of a short-circuit.

Fifth Embodiment

The fifth embodiment of the hinge device according to the present invention will be explained with reference to FIGS. 18 and 19.

The hinge device 110 of the fifth embodiment is comparatively compact, and is not equipped with the means to establish the electrical connections.

In the fifth embodiment, the same reference numbers are employed to designate like parts in the fourth embodiment, a detailed description thereof is omitted, and only the differences will be discussed. The difference between the fourth and fifth embodiments is that the flat spring 115 does not come in contact with the engaging slits 123 of the casing 112. Only the structure of the shaft base 114 and the flat spring 115 differs from those in the fourth embodiment.

Figure 18A:
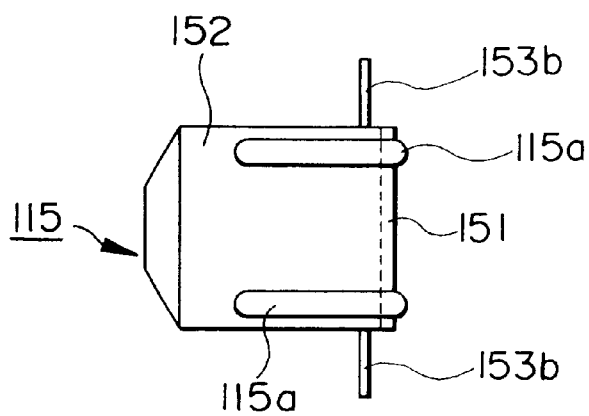
FIGS. 18A to 18C are diagrams showing a flat spring in the hinge device of the fifth embodiment according to the present invention.
Figure 18B:
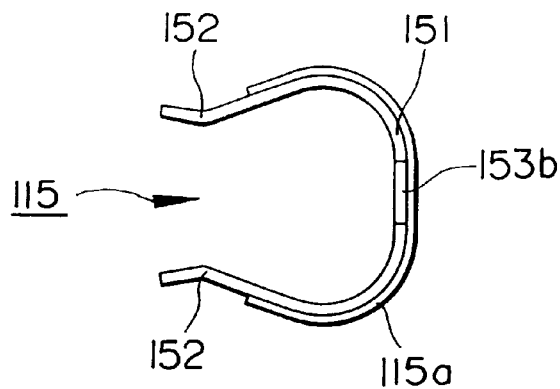
Figure 18C:
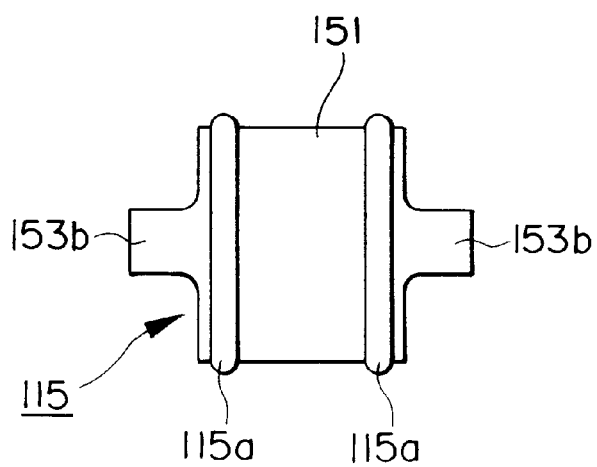
Figure 19:
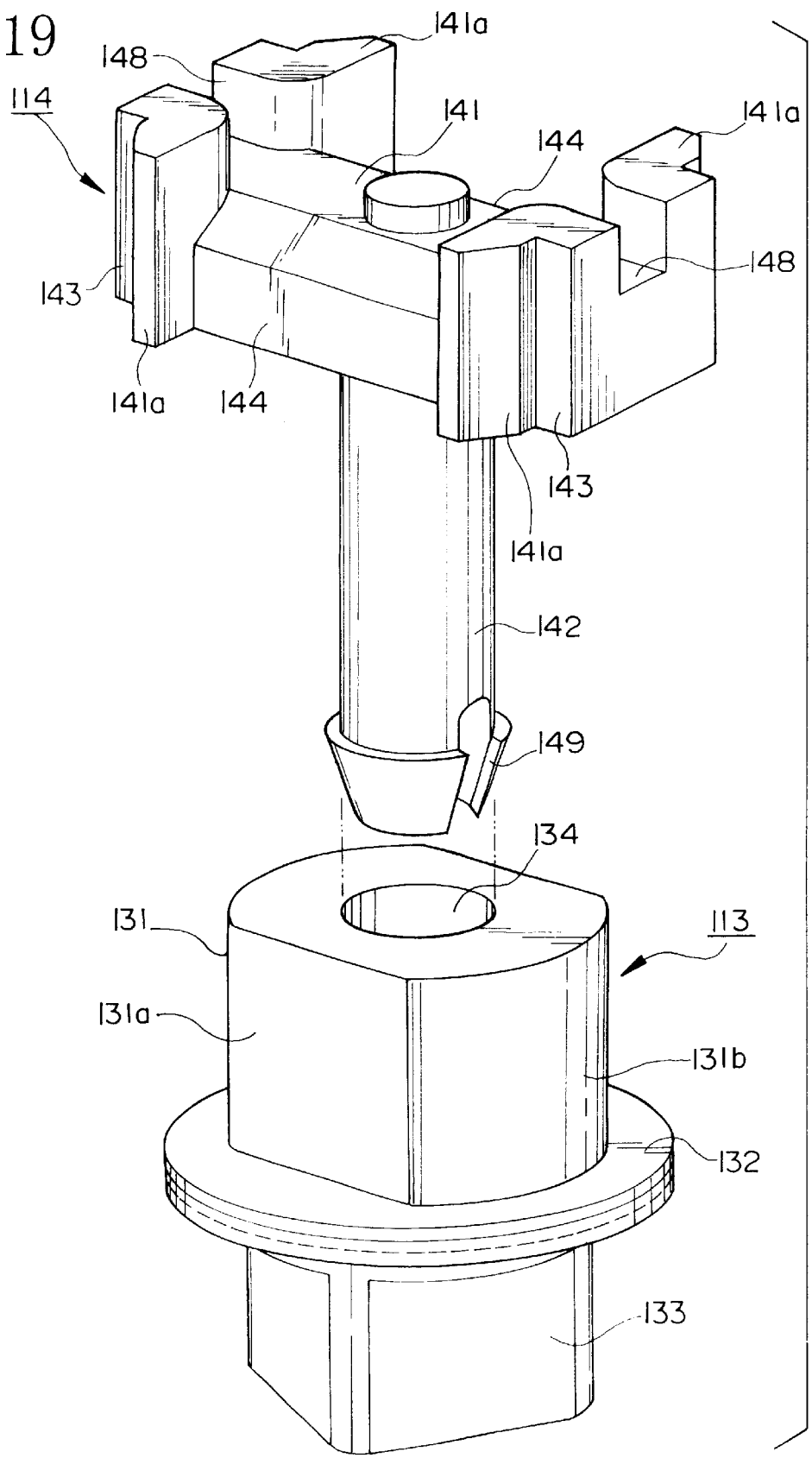
FIG. 19 is a perspective view showing a cam and a shaft base of the hinge device of the fifth embodiment of the present invention.

FIGS. 18A and 18B show the flat spring 115 of the fifth embodiment, and FIG. 19 shows the shaft base 114 and the cam 113 of the fifth embodiment.

The shaft base 114 defines engaging concavities 148 in the rear side of the stopper projections 143.

At the front tip of the shaft 142, an elastic hook 149 whose diameter is greater than the shaft 142 is formed. A slit is made in the tip of the elastic hook 149 so that the hook 146 can be elastically narrowed. During the insertion of the hook 149 through the through-hole 134, the hook 149 is elastically deformed so as to pass through the cam 113. After the hook 149 has been inserted to the maximum depth, the hook 149 is caught by a step (not shown) inside the through-hole 134.

The hinge device of the fifth embodiment has no through-hole because the device does not provide electrical connections.

The flat spring 115 has claws 153b smaller than the claws 153 in the fourth embodiment, and has no engaging hole because the device does not provide electrical connections.

The claws 153b are engaged with the engaging concavities 148. The flat spring 115 is thus attached to the shaft base 114, is movable forward and backward without contact with the engaging slits 123 of the casing 112, and is prevented from being rotated relative to the casing 112 and the shaft base 114.

In this hinge device, only the shaft base 114 is in contact with the engaging slits 123 while the flat spring 115 is not in contact with the engaging slits 123, and the rotation of the flat spring 115 relative to the casing 112 is inhibited. When the shaft base 114 is made from a material (for example, plastic) easy to slip on the casing 112, the cam 113 can smoothly move forward and backward. Therefore, by means of the hinge device 110, the flip member can be easily and smoothly attached to and detached from the main body of the portable electronic device, while maintaining the rotational stability of the cam 113.

Figure 20:
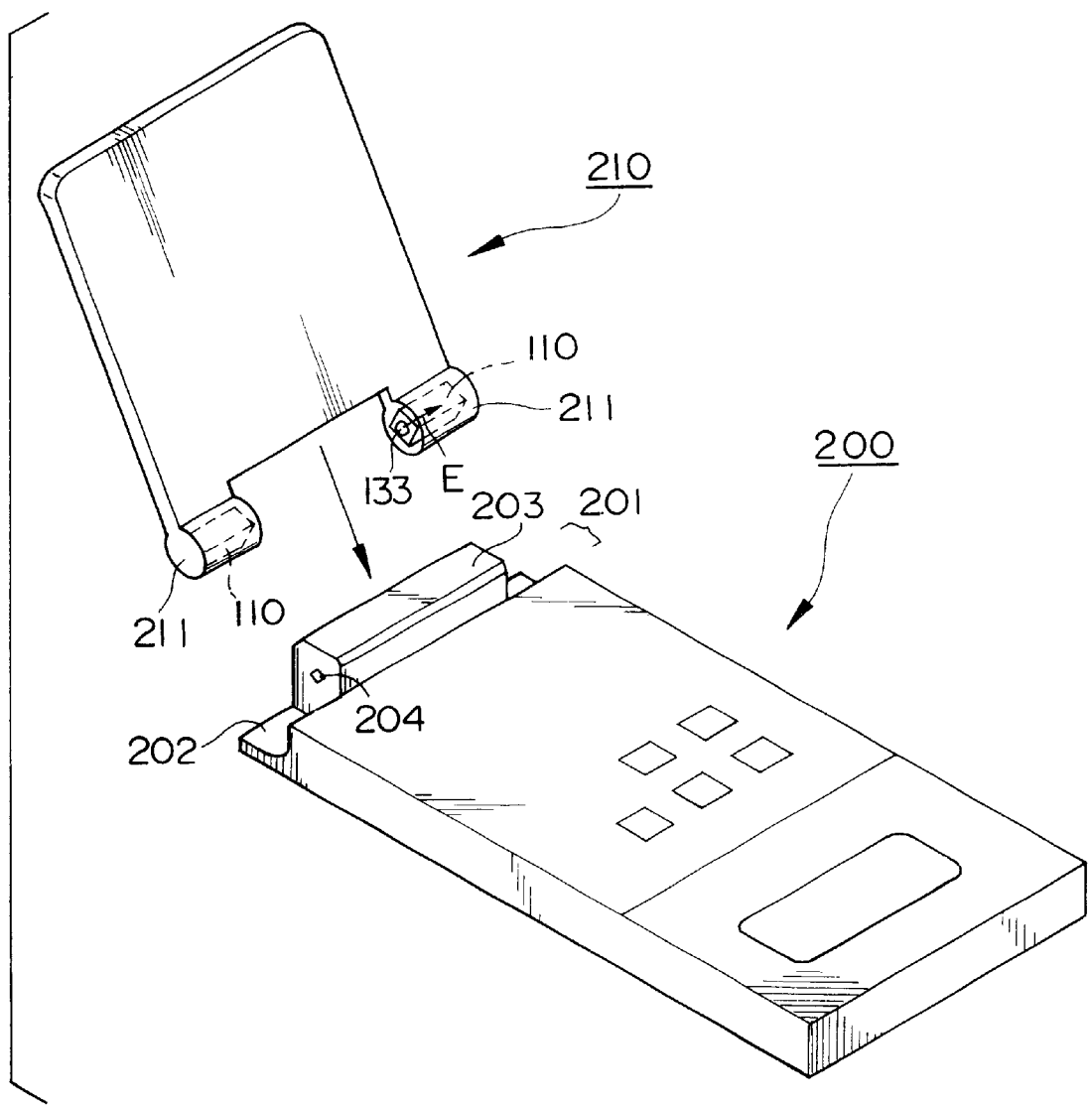
FIG. 20 is a perspective view showing an example of a portable phone to which the present invention is adopted.

The flip type portable phone with the hinge device 110 of the fourth or fifth embodiment will be explained with reference to FIG. 20. A flip member 210 is detachably and rotatably attached to a phone main body 200.

A connector 201 for connecting the flip member 210 is provided at the main body 200, and has concavities 202 and a rising section 203. The shapes of the concavities 202 and the rising section 203 are complementarily shaped relative to a connector 211 of the flip member 210.

At both ends of the rising section 203, mounting holes 204 are made. In the mounting holes 204, the projections 133 of the hinge device 110 of the flip member are tightly inserted. The shape and size of the mounting holes 204 is complementary to the projections 133.

The flip member 210 has two attachments 211. The attachments 211 are integrally formed with and project from both lower edges of the flip member 210. The attachments 211 include the hinge devices 10, which connect the flip member 210 rotatably and detachably to the phone main body 200.

To connect the flip member 210 to the phone main body 200, the projections 133 of the hinge device 110 are retracted (drawn back in the casing 112 by pressing the projection 133 in the direction E). Then, the attachments 211 are placed in the concavities 202 to make the projections 133 correspond to the mounting holes 204. While the projections 133 are biased toward the mounting holes 204 by the pressing springs 116, the projections 133 automatically project and are tightly fit in the mounting holes 204 when the pressing force toward the direction E disappears. Thus, the connection between the phone main body 200 and the flip member 210 is completed.

To establish the electrical connections between the phone main body 200 and the flip member 210 through the hinge device 110 of the fourth embodiment, a wiring part (such as a probe pin) in the through-hole 147 of the hinge device 110 may be in contact with a contact in the mounting hole 204.

To easily detach the flip member 210 from the phone main body 200, a mechanism for urging the projection 133 in the direction opposite to the direction E may be provided in the mounting hole 204. In this case, the flip member 210 may be detached and attached only in the manufacturing and maintenance process, and the detachable system may be unrecognized by a user. Alternatively, the user may detach the flip member 210 at will.

The present invention is not limited to these embodiments. For example, the shapes of the cam and the flat spring can be modified. The shapes and structures of the casing and the projections can be modified depending on a purpose and use of a device to which the present invention is applied. While in the above embodiments the present invention is applied to the portable electronic device, the invention can be applied to other devices such as a portable computer, an electronic note-book, and a game computer.

This invention may be embodied in other forms or carried out in other ways without departing from the spirit thereof the present embodiments care therefore to be considered in all respects illustrative and not limiting, the scope of the invention being indicated by the appended claims, and all modifications falling within the meaning and range of equivalency are intended to be embraced therein.

What is claimed is:

1. A hinge device comprising:

a casing having a projection hole;

a cam provided in said casing, said cam being rotatable with respect to a rotational axis, moveable with respect to said casing in the direction of the rotational axis, and undetachable from said casing, said cam having a projection retractable projecting through said projection hole and a cam face surrounding the rotational axis;

a flat spring for holding said cam face;

a base moveable with respect to said casing in the direction of the rotational axis, said cam being rotatably attached to said base; and a compression spring for urging said cam and said base toward the direction of said projection.

2. A hinge device according to claim 1, wherein one of said cam and said base has a rotation stopper, and the other has a concavity for receiving said rotation stopper.

3. A hinge device according to claim 1, further comprising a engaging mechanism for engaging said base with said casing to prevent rotation of said base relative to said casing.

4. A hinge device according to claim 3, wherein said engaging mechanism comprises a slit made in said casing, a projection formed with said base, and said projection is inserted through said slit.

5. A hinge device according to claim 1, wherein a pair of said flat springs having L-shapes are provided, the ends of said flat springs are fixed to said base, the other ends of said flat springs are in contact with said cam face, said two flat springs are positioned opposite to each other on both sides of said cam, and said compression spring is in contact with said flat springs so that the pressing force is converted by way of said flat spring into a force to close said flat springs.

6. A hinge device according to claim 1, wherein said flat spring has a U-shape, a middle portion of said flat spring is fixed to said base, both ends of said flat spring are in contact with said cam face, and said compression spring is in contact with said flat springs so that the pressing force is converted by way of said flat spring into a force to close said flat springs.

7. A hinge device according to claim 1, wherein said cam has a shaft hole corresponding to the rotational axis, and said base has a shaft inserted in said shaft hole so that said cam is rotatable relative to said base.

8. A hinge device according to claim 7, further comprising an engaging mechanism for engaging said base with said casing to prevent rotation of said base relative to said casing.

9. A hinge device according to claim 8, wherein said engaging mechanism comprises a slit made in said casing, a projection formed with said base, and said projection is inserted through said slit.

10. A hinge device according to claim 7, wherein said flat spring has a claw inserted in said slit.

11. A hinge device according to claim 7, wherein said flat spring has a claw, and said base has a concavity for engaging with said claw.

12. A hinge device according to claim 7, wherein a through-hole is made through said base and said cam.

13. A hinge device according to claim 1, wherein said cam face comprises:

a holder face for stably holding said flat spring; and a restoring force generating face for biasing said flat spring toward said holder face.

14. A hinge device according to claim 1, wherein a rib extends on said projection of said cam in the direction of the rotational axis.

15. A hinge device according to claim 1, wherein an extended rising portion is formed on said flat spring.

16. A hinge device according to claim 1, wherein said flat spring comprises a plurality of layered plates.

17. A hinge device according to claim 1, wherein an elastic hook for engaging with said cam is provided at the tip of said shaft of said base.

18. A flip member, which is pivotally connected to a main body by means of a hinge device, said hinge device comprising:

a casing having a projection hole;

a cam provided in said casing, said cam being rotatable with respect to a rotational axis, movable with respect to said casing in the direction of the rotational axis, and undetachable from said casing, said cam having a projection retractable projecting through said projection hole and a cam face surrounding the rotational axis;

a flat spring for holding said cam face;

a base movable with respect to said casing in the direction of the rotational axis, said cam being rotatably attached to said base; and a compression spring for urging said cam and said base toward the direction of said projection.

19. An electronic device having two members, which are pivotally interconnected by means of a hinge device, said hinge device comprising:

a casing having a projection hole;

a cam provided in said casing, said cam being rotatable with respect to a rotational axis, movable with respect to said casing in the direction of the rotational axis, and undetachable from said casing, said cam having a projection retractably projecting through said projection hole and a cam face surrounding the rotational axis;

a flat spring for holding said cam face;

a base movable with respect to said casing in the direction of the rotational axis, said cam being rotatably attached to said base; and a compression spring for pressing said cam and said base toward the direction of said projection.

* * * * *

UNITED STATES PATENT AND TRADEMARK OFFICE
CERTIFICATE OF CORRECTION

PATENT NO. : 6,295,358 B1
DATED : September 25, 2001
INVENTOR(S) : Kubota

It is certified that error appears in the above-identified patent and that said Letters Patent is hereby corrected as shown below:

<u>Title page,</u>
Item [73], now reads "Assignee: Straberry Corporation" should read
-- Assignee: Strawberry Corporation --

Item [74], now reads "Hoffman & Baron, LLP" should read
-- Hoffmann & Baron, LLP --

Signed and Sealed this

Third Day of September, 2002

*Attest:*

*Attesting Officer*

JAMES E. ROGAN
*Director of the United States Patent and Trademark Office*